United States Patent
Boutelle et al.

(10) Patent No.: US 11,578,260 B2
(45) Date of Patent: Feb. 14, 2023

(54) PROPPANTS AND METHODS OF MAKING AND USE THEREOF

(71) Applicant: US CERAMICS LLC, Denver, CO (US)

(72) Inventors: Tonia Boutelle, Sandersville, GA (US); Bradley Richards, Macon, GA (US); Jondahl Davis, Sandersville, GA (US); Dustin Johnson, Davisboro, GA (US); Trent Braswell, Wrightsville, GA (US)

(73) Assignee: U.S. Ceramics LLC, Wrens, GA (US)

( * ) Notice: Subject to any disclaimer, the term of this patent is extended or adjusted under 35 U.S.C. 154(b) by 0 days.

(21) Appl. No.: 15/733,232

(22) PCT Filed: Dec. 7, 2018

(86) PCT No.: PCT/US2018/064438
§ 371 (c)(1),
(2) Date: Jun. 12, 2020

(87) PCT Pub. No.: WO2019/118292
PCT Pub. Date: Jun. 20, 2019

(65) Prior Publication Data
US 2020/0377789 A1      Dec. 3, 2020

Related U.S. Application Data

(60) Provisional application No. 62/598,097, filed on Dec. 13, 2017.

(51) Int. Cl.
C09K 8/80 (2006.01)

(52) U.S. Cl.
CPC ...................... *C09K 8/80* (2013.01)

(58) Field of Classification Search
None
See application file for complete search history.

(56) References Cited

U.S. PATENT DOCUMENTS

| | | | |
|---|---|---|---|
| 2007/0202318 A1* | 8/2007 | Smith | C09K 8/805 428/323 |
| 2008/0135245 A1* | 6/2008 | Smith | C04B 35/56 166/280.1 |
| 2009/0038797 A1* | 2/2009 | Skala | C09K 8/80 507/239 |
| 2010/0300053 A1 | 12/2010 | Alary | |
| 2014/0318778 A1* | 10/2014 | Skala | E21B 43/267 166/280.1 |

(Continued)

FOREIGN PATENT DOCUMENTS

| | | |
|---|---|---|
| RU | 2 619 603 C1 | 5/2017 |
| WO | WO-2017-053664 A2 | 3/2017 |

OTHER PUBLICATIONS

International Search Report for International Application PCT/US2018/064438, dated Feb. 6, 2019.

*Primary Examiner* — John J Figueroa
(74) *Attorney, Agent, or Firm* — Finnegan, Henderson, Farabow, Garrett & Dunner, LLP

(57) ABSTRACT

The present disclosure includes proppants and methods of making the proppants. The proppants herein may contain titanium dioxide, silicon dioxide, and/or aluminum dioxide. Also included in the present disclosure are methods of using the proppants to treat a reservoir.

18 Claims, 1 Drawing Sheet

(56) References Cited

U.S. PATENT DOCUMENTS

| | | | |
|---|---|---|---|
| 2016/0024376 A1* | 1/2016 | Fitzgerald | C09K 8/62 |
| | | | 507/224 |
| 2016/0115375 A1* | 4/2016 | Loricourt | C09K 8/80 |
| | | | 428/397 |
| 2016/0186048 A1 | 6/2016 | Anschutz et al. | |
| 2016/0376199 A1* | 12/2016 | Koep | C04B 35/52 |
| | | | 507/271 |
| 2017/0275209 A1 | 9/2017 | Windebank et al. | |

* cited by examiner

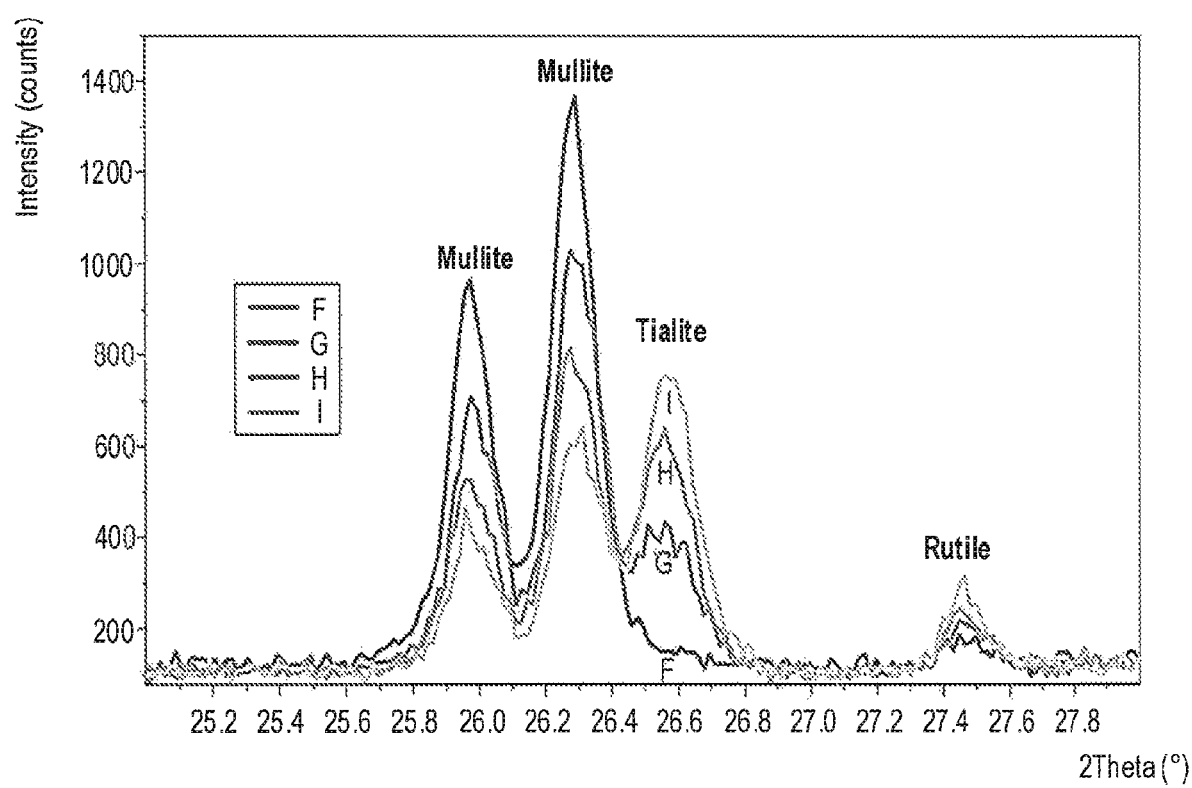

PROPPANTS AND METHODS OF MAKING AND USE THEREOF

CLAIM FOR PRIORITY

This application is a U.S. national phase entry of International Application No. PCT/US2018/064438, filed Dec. 7, 2019, which claims the benefit of priority from U.S. Provisional Application No. 62/598,097, filed Dec. 13, 2017, to both of which this application claims the benefit of priority, and the entirety of the subject matter of both of which is incorporated herein by reference.

TECHNICAL FIELD

Embodiments of the present disclosure relate generally to ceramic proppants and methods of making thereof.

BACKGROUND

Naturally occurring deposits containing oil and natural gas are located throughout the world. Given the porous and permeable nature of the subterranean structure, it is possible to bore into the earth and set up a well where oil and natural gas are pumped out of the deposit. These wells may be large, costly structures that are typically fixed at one location. As is often the case, a well may initially be very productive, with the oil and natural gas being pumpable with relative ease. As the oil or natural gas near the wellbore is removed from the deposit, other oil and natural gas may flow to the area near the wellbore so that it may be pumped as well. However, as a well ages and sometimes merely as a consequence of the subterranean geology surrounding the wellbore, the more remote oil and natural gas may have difficulty flowing to the wellbore, thereby reducing the productivity of the well.

To address this problem and to increase the flow of oil and natural gas to the wellbore, a technique may be employed of fracturing the subterranean area around the well to create more paths for the oil and natural gas to flow toward the wellbore. This fracturing may be performed by hydraulically injecting a fracturing fluid at high pressure into the area surrounding the wellbore. This fracturing fluid is thereafter removed from the fracture to the extent possible so that it does not impede the flow of oil or natural gas back to the wellbore. Once the fracturing fluid is removed, however, the fractures may tend to collapse due to the high compaction pressures experienced at well-depths, which may exceed 20,000 feet.

To reduce the likelihood of the fractures closing, a propping agent, also known as a "proppant," may be included in the fracturing fluid, so that as much of the fracturing fluid as possible may be removed from the fractures while leaving the proppant behind to hold the fractures open.

Because there may be extremely high closing pressures in factures, it may be desirable to provide proppants that have a high crush resistance. For example, the useful life of the well may be shortened if the proppant particles break down, allowing the fractures to collapse and/or clog with "fines" created by the broken-down proppant particles. For this reason, it may be desirable to provide proppants that are resistant to breakage, even under high crush pressures.

As resources become scarcer, the search for oil and natural gas may involve penetration into deeper geological formations, and the recovery of the such resources may become increasingly difficult. Therefore, there may be a desire to provide proppants that have sufficient crush strength as well as and an excellent conductivity and permeability under extreme conditions. In addition, there may be a desire to provide proppants additives formed from less costly or more prevalent materials that still provide one or more desirable characteristics for propping fractures in modern wells.

SUMMARY OF THE DISCLOSURE

The present disclosure includes proppants. In some examples, the proppants may comprise a ceramic, wherein the ceramic comprises from about 5% to about 25% by weight titanium dioxide, from about 30% to about 75% by weight aluminum oxide, and from about 10% to about 65% by weight silicon dioxide. In at least one example, the ceramic may comprise from about 40% to about 65% by weight silicon dioxide. In at least one example, at least 80% by weight of the titanium dioxide in the ceramic may be anatase. In some examples, the ceramic may further comprise from about 0.01% to about 10% by weight iron oxide.

According to some aspects of the present disclosure, the proppants may comprise a ceramic, wherein the ceramic may comprise from about 5% to about 40% by weight tialite; and mullite. In at least one example, the ceramic may comprise from about 10% to about 70% by weight mullite. In at least one example, the ceramic may further comprise from about 0.05% to about 10% by weight rutile.

According to some aspects of the present disclosure, the proppants herein may have a crush strength of less than 10% fines at 10,000 psi. Additionally or alternatively, the proppant may have a permeability of at least 0.01 millidarcy.

In some examples, the proppant may further comprise a binding agent, such as, for example, a flocculation agent. In at least one example, the flocculation agent may comprise an acrylate polymer. In some examples, the proppants may have a turbidity of less than 250 Nephelometric Turbidity Unit (NTU). In at least one example, proppants may have a turbidity of less than 50 NTU.

Further provided herein are methods of making a proppant, such as the proppants discussed above and elsewhere herein. For example, the method may comprise granulating a clay that comprises kaolinite and at least 5% by weight titanium dioxide; and sintering the granulated clay. In some examples, the clay may comprise at least 50% by weight kaolinite. In some examples, the method may further comprise adding titanium dioxide to the clay before granulating.

According to some aspects of the present disclosure, granulating the clay may comprise grinding a slurry that comprises the clay. In some examples, the slurry may be prepared by combining the clay with water, the slurry having a solids content ranging from about 40% to about 60% by weight. In some examples, the slurry may be a first slurry prepared by combining the clay in dry form with a second slurry comprising water and a material different than the clay. In at least one example, the slurry may comprise at least one dispersant. In some cases, the slurry may have a solids content ranging from about 45% to about 75% by weight, for example.

According to some aspects of the present disclosure, the method may further comprise forming a pellet from the granulated clay before sintering. In at least one example, the pellet may be formed by a fluidizer.

According to some aspects of the present disclosure, the clay used to prepare the proppants may be a by-product of a kaolin beneficiation process. In some cases, the beneficiation process may be a selective flocculation process. In some cases, the by-product may comprise at least 8% by weight titanium dioxide. For example, the by-product may comprise at least 15% by weight titanium dioxide. In at least one example, the by-product may comprise a flocculating agent.

In some examples, greater than 40% of particles in the granulated clay may have an equivalent spherical diameter of less than 0.25 µm as measured by Sedigraph. In at least one example, the method may further comprise adding a binding agent before or during granulating the clay. In at least one example, sintering may be performed at a temperature ranging from about 1200° C. to about 1600° C.

Also disclosed herein are methods of treating a reservoir, e.g., using the proppants. For example, the methods may comprise introducing the proppant described herein into the reservoir. In some examples, the reservoir may comprise a wellbore. In some examples, the methods may further comprise mixing the proppant with a fluid before introducing the proppant into the reservoir. In some examples, the proppant may have a concentration in the fluid ranging from about 0.1 pounds of proppant added (PPA) to about 20 PPA.

BRIEF DESCRIPTION OF DRAWINGS

Embodiments and various aspects of the present disclosure are illustrated in the following detailed description and the accompanying FIGURE. Various features shown in the FIGURE are not drawn to scale.

FIG. 1 shows X-ray diffraction patterns for proppants containing various amounts of $TiO_2$ as discussed in Example 4.

DETAILED DESCRIPTION

Particular aspects of the present disclosure are described in greater detail below. The terms and definitions provided herein control, if in conflict with terms and/or definitions incorporated by reference.

As used herein, the terms "comprises," "comprising," or any other variation thereof are intended to cover a non-exclusive inclusion, such that a process, method, composition, article, or apparatus that comprises a list of elements does not include only those elements, but may include other elements not expressly listed or inherent to such process, method, composition, article, or apparatus. The term "exemplary" is used in the sense of "example" rather than "ideal."

As used herein, the singular forms "a," "an," and "the" include plural reference unless the context dictates otherwise. The terms "approximately" and "about" refer to being nearly the same as a referenced number or value. As used herein, the terms "approximately" and "about" should be understood to encompass ±5% of a specified amount or value.

Provided here are proppants, e.g., ceramic proppants. The proppants may provide structural support in a fracture and may be shaped to have anti-flowback properties. The proppants herein may comprise a ceramic that contains one or more minerals. The amount of the mineral(s) may allow the proppants to have properties that are suitable to be used for treating a reservoir, such as suitable crush strength and/or permeability. In some examples, the proppants may comprise a ceramic that contains titanium dioxide, aluminum oxide, silicon dioxide, or a combination thereof.

Also provided herein are methods for making the proppants. The methods may comprise one or more steps of: granulating a clay comprising titanium dioxide, e.g., at least 3%, at least 5%, or at least 8% by weight titanium dioxide, forming pellets from the granulated clay, and sintering the pellets to make the proppants. The clay used as the source material(s) may comprise a natural clay and/or processed clay or mineral, such as a by-product of a flocculation process. In some cases, the methods may further comprise adding titanium dioxide to the clay before granulating.

Further disclosed herein are methods of treating a reservoir using the proppants. The methods may comprise mixing the proppants with a fluid and introducing the proppant-fluid mixture into the reservoir (e.g., into the wellbore of the reservoir). The fluid may induce hydraulic fractures inside the reservoir and the proppants may have suitable properties (e.g., sufficient crush strength) to keep the fractures open.

The proppants herein may comprise a ceramic or mixture of ceramics. The term "ceramic" as used herein refers to an inorganic solid material. The ceramic(s) may comprise one or more oxides (e.g., titanium dioxide, aluminum oxide, silicon dioxide, iron oxide, or any combinations thereof), non-oxides (e.g., carbide, boride, nitride, silicide), or any combinations thereof. The ceramic material may be formed, for example, by heating a desired mineral or mixture of minerals, e.g., by sintering. The resulting ceramic(s) may comprise titanium dioxide, aluminum oxide, and/or silicon dioxide in various crystal forms, such as tialite ($Al_2TiO_5$), mullite ($3Al_2O_3 2SiO_2$ and/or $2Al_2O_3 SiO_2$), cristobalite ($SiO_2$), anatase ($TiO_2$), rutile ($TiO_2$), and/or brookite ($TiO_2$).

The ceramics herein may comprise titanium dioxide. In some examples, the ceramic may comprise from about 1% to about 50%, e.g., from about 5% to about 50%, from about 5% to about 25%, from about 5% to about 15%, from about 8% to about 50%, from about 8% to about 25%, from about 8% to about 20%, or from about 8% to about 15% by weight titanium dioxide. In some examples, the ceramic may comprise at least 1%, at least 5%, at least 8%, at least 10%, at least 15%, at least 20%, at least 25%, at least 30%, or at least 40% by weight titanium dioxide. In at least one example, the ceramic may comprise from about 5% to about 25% by weight titanium dioxide.

The titanium dioxide in the ceramic may be in one or more mineral forms. For example, the titanium dioxide present in the form of anatase, brookite, rutile, tialite, or a mixture thereof. According to some aspects of the present disclosure, at least 50%, at least 60%, at least 70%, at least 80%, at least 90%, at least 95%, or at least 99% by weight of the titanium dioxide is anatase. In some examples, from about 1% to about 100%, e.g., from about 10% to about 90%, from about 50% to about 80%, from about 60% to about 90%, from about 70% to about 99%, or from about 80% to about 99% by weight of the titanium dioxide is anatase. In some examples, the ceramic comprises a mixture of tialite and anatase, wherein at least 50% by weight of the titanium dioxide present is anatase.

The ceramics herein may comprise aluminum oxide. In some examples, the ceramic may comprise from about 1% to about 100%, e.g., from about 10% to about 90%, from about 20% to about 80%, from about 30% to about 75%, from about 50% to about 75%, from about 60% to about 80%, from about 40% to about 70%, or from about 50% to about 65% by weight aluminum oxide. In at least one example, the ceramic may comprise from about 30% to about 75% by weight aluminum oxide. The aluminum oxide may be present, for example, as tialite and/or mullite.

The ceramics herein may comprise silicon dioxide. In some examples, the ceramic may comprise from about 1% to about 100%, e.g., from about 10% to about 90%, from about 5% to about 70%, from about 10% to about 70%, from about 10% to about 65%, from about 20% to about 65%, from about 30% to about 65%, from about 40% to about 65%, from about 20% to about 70%, or from about 40% to about 70% by weight silicon dioxide. In at least one example, the ceramic may comprise from about 10% to about 65% by weight silicon dioxide. In at least another example, the ceramic may comprise from about 40% to about 65% by weight silicon dioxide. The silicon dioxide may be present, for example, as mullite, cristobalite, or a combination thereof.

The ceramics herein may additionally or alternatively comprise iron oxide. In some examples, the ceramic may comprise from about 0.01% to about 20%, e.g., from 0.01 to 10%, from about 0.01% to about 5%, from about 0.01% to about 2.5%, from about 0.01% to about 2%, from about 0.01% to about 1%, from about 0.01% to about 0.5%, or from about 0.05% to about 1.5% by weight iron oxide. In at least one example, the ceramic may comprise from about 0.01% to about 2.5% by weight iron oxide. In some examples, the ceramic may comprise less than 10%, less than 5%, less than 3%, less than 2.5%, less than 2%, or less than 1% by weight iron oxide. In at least one example, the ceramic may comprise from about 0.01% to about 10% by weight iron oxide.

As mentioned above, the ceramic may comprise one or more crystal phases of the minerals. In some examples, the ceramic may comprise tialite, mullite, rutile, or a mixture thereof. In at least one example, the ceramic may comprise tialite and mullite. In at least one example, the ceramic may comprise tialite, mullite, and rutile.

For example, the ceramic may comprise from about 1% to about 50%, e.g., from about 5% to about 40%, from about 10% to about 40%, from about 10% to about 30%, or from about 20% to about 40% by weight tialite. In at least one example, the ceramic may comprise from about 5% to about 40% by weight tialite. Additionally or alternatively, the ceramic may comprise from about 1% to about 80%, e.g., from about 5% to about 70%, from about 10% to about 70%, from about 10% to about 60%, from about 20% to about 50%, from about 10% to about 40%, from about 20% to about 40%, or from about 30% to about 60% by weight mullite. In at least one example, the ceramic may comprise from about 10% to about 70% by weight mullite. Additionally or alternatively, the ceramic may comprise from about 0.01% to about 20%, e.g., from about 0.05% to about 10, from about 0.01% to about 8%, from about 0.01% to about 5%, from about 0.01% to about 2%, from about 0.05% to about 8%, from about 0.05% to about 5%, or from about 0.05% to about 2% by weight rutile. In at least one example, the ceramic may comprise from about 0.05% to about 10% by weight rutile.

The proppants herein may further comprise one or more binding agents, additives, and/or coatings. Exemplary binding agents include, but are not limited to, polymers or copolymers of acrylamide (e.g., polyacrylamide), methyl cellulose, polyvinyl butyrals, polymers or copolymers of acrylic acid or derivatives thereof (e.g., polyacrylics, polyacrylates, emulsified acrylates, etc.), polyvinyl alcohols, polyvinyl pyrrolidones, starch, silicon binders, silicates, polyethylene imine, lignosulphonates, phosphates, alginates, and any combination thereof. In at least one example, the binding agent may be a flocculation agent, e.g., polyacrylamide. In some cases, the proppants herein may also comprise one or more solvents. Exemplary solvents include, but are not limited to, water, alcohols, ketones, aromatic compounds, hydrocarbons, similar solvents, and any combinations thereof.

The additive(s) may comprise one or more lubricants, one or more plasticizers, or any mixtures thereof. Examples of the lubricant(s) include, but are not limited to, ammonium stearates, wax emulsions, oleic acid, Manhattan fish oil, stearic acid, wax, palmitic acid, linoleic acid, myristic acid, lauric acid, and any combinations thereof. Examples of the plasticizer(s) include, but are not limited to, polyethylene glycol, octyl phthalates, ethylene glycol, and any combinations thereof.

The proppants herein may comprise one or more coatings. Applying such coating(s) may provide various desirable characteristics, including, for example, the ability to control the dispersion of fine particulates that may be generated, for example, under injection or closure pressures. The coating(s) may comprise natural and/or synthetic materials, including, but not limited to, natural rubber, elastomers such as butyl rubber, polyurethane rubber, various starches, petroleum pitch, tar, asphalt, organic semisolid silicon polymers such as dimethyl and methylphenyl silicones, polyhydrocarbons such as polyethylene, polypropylene, polyisobutylene, cellulose lacquers, nitrocellulose lacquers, vinyl resins such as polyvinylacetate, phenolformaldehyde resins, urea formaldehyde resins, acrylic ester resins such as polymerized esters resins of methyl, ethyl and butyl esters of acrylic and alpha-methylacrylic acids, epoxy resins, melamine resins, drying oils, mineral and petroleum waxes, urethane resins, phenolic resins, epoxide phenolic resins, polyepoxide phenolic resins, novolac epoxy resins, formaldehyde phenolic resins, and any combinations thereof.

The proppants herein may have characteristics suitable for one or more applications. For example, the proppants may have desired shape, crush strength, permeability, conductivity, turbidity, and other relevant characteristics that are suitable for using in treating a reservoir, e.g., in a fracking application.

The proppants herein may have a desired shape. In at least one example, the proppants may have a round or rounded shape. In at least one example, the proppants may have a rod-shape. As used herein, the term "rods" does not necessarily indicate that the cross-section of the proppant particles is circular. Rather, the term "rods" may indicate that the proppant particles have a length and a cross-sectional shape taken substantially perpendicular to an axis in the direction of the length. In some examples, the proppants may have a desired cross-sectional shape, e.g., a circular cross-section or a non-circular cross section (e.g., a polygonal cross-section, or a multifoil-shaped cross-section).

The proppants herein may have a desired crush strength as measured by ISO standard 13503-2 (Proppant Crush Test for Hydraulic Fracturing and Gravel-Packing Operations). In some examples, the proppant may have a crush strength of less than 20% fines at 10,000 pounds per square inch (psi), less than 15% fines at 10,000 psi, less than 10% fines at 10,000 psi, less than 5% fines at 10,000 psi, less than 2% fines at 10,000 psi, or less than 1% fines at 10,000 psi. In at least one example, the proppant may have a crush strength of less than 10% fines at 10,000 psi. Proppants with a relatively high titanium dioxide content, e.g., at least 5%, at least 10%, or at least 15% by weight, may exhibit an improved crush strength compared to proppants with a relatively low titanium dioxide content (e.g., less than 5% or less than 3% by weight).

The crush strength of the proppants may be measured by a proppant crush resistance test described in ISO 13503-2: "Measurement of Properties of Proppants Used in Hydraulic Fracturing and Gravel-packing Operations." In this test, a sample of proppant is first sieved to remove any fines (i.e., undersized pellets or fragments that may be present), then placed in a crush cell where a piston is then used to apply a confined closure stress of some magnitude above the failure point of some fraction of the proppant pellets. The sample is then re-sieved and the weight percent of fines (e.g., particles with a size smaller than the sieve size) generated as a result of pellet failure is reported as percent crush. A comparison of the percent crush of two equally sized samples is a method of gauging the relative strength of the two samples.

Additionally or alternatively, the proppants may have desired permeability characteristics. The permeability of the proppants may be measured according to ISO 13503-5. According to some aspects of the present disclosure, the proppants may have a permeability ranging from about 0.001 milidarcy (mD) to about 1 mD, e.g., from about 0.005 mD to about 0.5 mD, from about 0.01 mD to about 0.2 mD, or from about 0.05 mD to about 0.1 mD. In some examples, the proppants may have a permeability of at least 0.001 mD, at least 0.005 mD, at least 0.01 mD, at least 0.05 mD, at least 0.1 mD, at least 0.5 mD, or at least 1 mD. In cases where the proppants are introduced into to a reservoir with a liquid (e.g., fracking fluid), the proppants may have a permeability that allows the liquid to flow down the reservoir and the materials (e.g., gas or oil) from to reservoir to flow up, e.g., a permeability of at least 0.01 mD.

The proppants may have a suitable turbidity value. The turbidity of the proppants may be measured according to ISO 13503-2. In some examples, the proppants may have a turbidity ranging from about 1 Nephelometric Turbidity Unit (NTU) to about 300 NTU, e.g., from about 1 NTU to about 250 NTU, from about 1 NTU to about 200 NTU, from about 1 NTU to about 150 NTU, from about 1 NTU to about 100 NTU, from about 1 NTU to about 80 NTU, from about 1 NTU to about 50 NTU, from about 1 NTU to about 30 NTU, from about 1 NTU to about 20 NTU, from about 1 NTU to about 10 NTU, or from about 1 NTU to about 5 NTU. In some examples, the proppants may have a turbidity of less than 300 NTU, less than 250 NTU, less than 200 NTU, less than 150 NTU, less than 100 NTU, less than 50 NTU, or less than 20 NTU. In at least one example, the proppants may have a turbidity of less than 250 NTU. In at least another example, the proppants may have a turbidity of less than 50 NTU.

In some examples, the proppants may have a $d_{50}$ diameter ranging from about 5 µm to about 4000 µm, e.g., from about 10 µm to about 3700 µm, from about 20 µm to about 3500 µm, from about 25 µm to about 3350 µm, from about 50 µm to about 3000 µm, from about 75 µm to about 200 µm 0, from about 75 µm to about 1700 µm, from about 100 µm to about 1500 µm, from about 150 µm to about 1180 µm, or from about 200 µm to about 1000 µm. The size distribution of the proppants may be measured following ISO 13503-2.

Also disclosed herein are methods of making the proppants. In general, the methods may comprise one or more of: granulating a clay and sintering the granulated clay. In some cases, the methods may further comprise, before sintering, forming pellets from the granulated clay. In cases where pellets are formed, sintering the granulated clay may comprise sintering the pellets.

Clays suitable for preparation of the proppants herein may comprise a natural clay and/or a processed clay (including, e.g., a byproduct of a mineral process, such as beneficiation). The clay(s) used for making the proppants may comprise alumina- and/or aluminosilicate-containing material, such as, for example kaolin clay, ball clay, bauxitic kaolin, smectite clay, bauxite, gibbsite, boehmite, metakaolin, diaspore, or any mixtures thereof. In at least one example, the clay may comprise kaolinite, such as a kaolin clay or ball clay. Kaolin clay typically comprises at least 50% by weight kaolinite. Kaolinite is an aluminum silicate having a layered structure with the chemical formula of $Al_2Si_2O_5(OH)_4$. Kaolin may comprise one or more minerals other than kaolinite, such as one or more smectite clays. Ball clay is a sedimentary clay of natural origin that typically comprises about 20%-80% kaolinite, about 10%-25% mica, about 6%-65% quartz, and various other organic and inorganic materials.

According to some aspects of the present disclosure, the clay(s) may comprise at least 5%, at least 10%, at least 30%, at least 50%, at least 70%, or at least 90% by weight alumina- or aluminosilicate-containing material. In some examples, the clay may comprise from about 5% to about 100%, from about 50% to about 90%, from about 30% to about 50%, from about 40% to about 60%, from about 50% to about 70%, from about 60% to about 80%, from about 70% to about 90%, or from about 80% to about 99% by weight alumina- or aluminosilicate-containing material. In at least one example, the clay may comprise at least 50% by weight aluminosilicate material, such as, for example, kaolinite.

The clay(s) may comprise one or more minerals, such as, for example, mineral(s) of the proppants described herein, e.g., titanium dioxide, aluminum oxide, silicon dioxide, or a combination thereof. In some examples, the clay(s) may comprise titanium dioxide. According to some aspects of the present disclosure, the clay used for making the proppants may comprise at least 1%, at least 5%, at least 10%, at least 15%, at least 20%, at least 25%, or at least 30% by weight titanium dioxide. In some examples, the clay used for making the proppants may comprise from about 1% to about 30%, from about 1% to about 20%, from about 5% to about 25%, from about 5% to about 20%, from about 5% to about 15%, from about 10% to about 30%, or from about 10% to about 20% by weight titanium dioxide. Without intending to be bound by theory, it is believed that the amount of titanium dioxide may affect certain properties of the proppant, such as, for example, crush strength. For example, the amount of titanium dioxide (e.g., at least 3%, at least 5%, or at least 8% by weight) may provide for a desired crush strength (e.g., less than 10% fines at 10,000 psi).

As mentioned above, the clay(s) may comprise a natural clay (e.g., a naturally occurring ore or clay). According to some aspects of the present disclosure, the clay may comprise a naturally occurring ore or clay that comprises at least 3%, e.g., at least 4%, at least 5%, at least 6%, or at least 8% by weight titanium dioxide. In some examples, the clay may comprise a naturally occurring ore or clay that comprises from about 1.0% to about 10.0%, from about 2.0% to about 7.0%, from about 3.0% to about 6.0%, from about 4.0% to about 6.0%, from about 4.0% to about 5.0%, from about 4.5% to about 5.5%, from about 5% to about 6%, or from about 5.5% to about 6.5% by weight titanium dioxide. In at least example, the naturally occurring ore or clay may comprise kaolinite, e.g., natural kaolin clay, natural ball clay, or a mixture thereof.

Alternatively or additionally, the clay(s) may comprise a processed clay, such as a by-product of a mineral beneficiation process. The term "beneficiation" as used herein refers to any process that removes impurities or otherwise improves the characteristics of an ore. Examples of beneficiation processes include, but are not limited to, selective flocculation, reductive leaching, dewatering, degritting, desanding, floatation (e.g., froth floatation), separation (e.g., magnetic separation or gravity separation), and any combination thereof.

According to some aspects of the present disclosure, the clay(s) used for preparation of the proppants comprise a byproduct of selective flocculation. The term "selective flocculation" as used herein refers to a process of selectively flocculating the desirable or undesirable mineral from a mixture of minerals. In some examples, the clay comprises a by-product of a selective flocculation of kaolin. Selective flocculation may be used to remove titanium dioxide from kaolin, for example. In some selective flocculation methods, kaolin containing titanium dioxide (and other fine impurities) may be mixed with additives that cause the titanium dioxide to flocculate, to settle to the bottom of a thickener or settling bowl, and to leave the product kaolin to be recovered from the supernatant in dispersed form. The efficiency of selective flocculation may be improved by flocculating and recovering the kaolin component, and leaving the impurities to separate in the aqueous supernatant. In such processes, the kaolin may first be dispersed by adding chemicals that increase its alkalinity. Dispersing agents may also be optionally added. High molecular weight polymers may be added to the dispersed aqueous kaolin suspension. The suspension may then be flocculated. During flocculation, the high molecular weight polymers may adhere preferentially to kaolin, with limited or no attachment to titanium dioxide or other impurities. This may facilitate titanium dioxide separation and produce a by-product (waste stream) comprising titanium dioxide. The by-product may be used for making the proppants described herein.

When the by-product is used for making the proppants, the mineral(s) in the by-product may provide desired properties for the proppants. In at least one example, the by-product may comprise titanium dioxide. For example, the by-product may comprise at least 1%, at least 3%, at least 5%, at least 10%, at least 15%, at least 20%, at least 25%, or at least 30% by weight titanium dioxide. In some examples, the by-product may comprise from about 1% to about 40%, from about 3% to about 30%, from about 5% to about 30%, from about 5% to about 20%, from about 10% to about 25%, or from about 10% to about 20% by weight titanium dioxide. In at least one example, the by-product may comprise at least 3% by weight titanium dioxide. In at least one example, the by-product may comprise at least 15% by weight titanium dioxide.

If generated from a selective flocculation process, the by-product may comprise one or more flocculating agents. The flocculating agents may comprise one or more organic polymers. Such organic polymers may include water-soluble weakly anionic organic polyelectrolytes having an average molecular weight greater than about 10,000 kDa, greater than about 100,000 kDa, or greater than about 1,000,000 kDa. Weakly anionic polymers may contain both anionic and non-ionic groups. Anionic properties may be imparted to synthetic non-ionic organic polymers, for example, by the presence of side chains of anionic groups, such as carboxylic acid, carboxylic anhydride, and carboxylic acid salt groups. Non-ionic groups in a side chain in the polymer may also be present resulting from the presence of certain hydrophilic groups, e.g., one or more of the following hydrophilic groups: carboxylic acid amide, carboxyl alkyl ester, pyrrolidone, hydroxyl, hydroxyl alkyl ether, and alkoxy groups.

The clay(s) may be granulated by a granulator. The granulator may be any type of granulation device, such as, for example, an Eirich mixer, a pan pelletizer, or a pin mill.

According to some aspects of the present disclosure, the method further comprises adding one or more minerals to the clay(s) before and/or during granulating the clay(s). The mineral(s) added to the clay may provide desired properties for the proppants. According to some aspects of the present disclosure, the mineral(s) added to the clay may comprise titanium dioxide. Any suitable material that comprises at least 20%, at least 40%, at least 60%, at least 80%, at least 90%, at least 95%, or at least 99% by weight titanium dioxide may be added. In at least one example, high purity titanium dioxide (e.g., 99.5% titanium dioxide) may be added. In at least one example, the titanium dioxide added may be present as anatase, rutile, or a mixture thereof.

According to some aspects of the present disclosure, the methods of preparing the proppants may comprise adding water to the clay(s) to make a slurry and granulating the slurry. In these cases, the clay herein may be a part of the slurry.

In some examples, the slurry may comprise sufficient water for granulation. In at least one example, the methods of making the proppants may be performed without adding water to the granulator separate from the slurry.

According to some aspects of the present disclosure, the methods of making proppants may comprise mixing a first slurry with the clay to make a second slurry, and then granulating the second slurry, wherein the first slurry comprises a material different than the clay(s). In at least one example, the first slurry may comprise one or more additives such as the binding agents described herein. In some examples, the clay may be granulated without adding the first slurry or any additional water.

The slurry (or slurries) described herein may comprise one or more binding agents described herein. The binding agent(s) may be added to the clay or slurry before granulating the clay. Alternatively, the binding agent(s) may be added to the clay or slurries during the granulating process. The binding agent(s) may be from an unfired composition that contains a binding agent. Alternatively or additionally, the binding agent(s) may be separately added to the slurry part from the insoluble material.

In some cases, the slurry (or slurries) may comprise one or more dispersants. The dispersant(s) may comprise polymeric anionic dispersants, such as, for example, sodium polyacrylate, polymethacrylate, a copolymer of acrylate and a second compound (e.g., a maleic/acrylic copolymer).

The slurry (or slurries) may comprise a solids content suitable for the granulating process. As used herein the solids content of the slurry refers to the weight of the insoluble material relative to the weight of the water in the slurry. In some examples, the slurry may have a solids content ranging from about 10% to about 90%, e.g., from about 20% to about 70%, from about 40% to about 60%, from about 30% to about 50%, from about 50% to about 70%, from about 45% to about 55%, from about 30% to about 80%, from about 45% to about 75%, from about 40% to about 70%, or from about 50% to about 80%. In at least one example, the slurry may have a solids content ranging from about 40% to about 60%. In at least one example, the slurry may have a solids content ranging from about 45% to about 75%.

In some examples, the granulated clay may have a $d_{50}$ diameter ranging from about 1 μm to about 5 μm, e.g., from about 1 μm to about 3 μm, from about 2 μm to about 5 μm, or from about 1.5 μm to about 3.5 μm. The particle size distribution may be measured by sedimentation of minerals in a fully dispersed condition in an aqueous medium using a Sedigraph 5100 machine as supplied by Micromeritics Instruments Corporation, Norcross, Ga., USA. Such a machine may provide measurements and a plot of the cumulative percentage by weight of particles having a size, referred to as the "equivalent spherical diameter" (e.s.d.), less than given e.s.d. values. The mean particle size $d_{50}$ is the value determined in this way of the particle e.s.d. at which there are 50% by weight of the particles which have an equivalent spherical diameter less than that $d_{50}$ value. In some examples, the particle size distribution of the granulated clay may be such that greater than 90%, such as, e.g., greater than 93%, greater than 94%, greater than 95%, or greater than 96% of the particles have an e.s.d. of less than 2 μm as measured by Sedigraph. In some examples, the particle size distribution of the granulated clay may be such that greater than 85% of the particles, such as, for example, greater than 87%, greater than 89%, greater than 90%, or greater than 92% have an e.s.d. of less than 1 μm as measured by Sedigraph. For example, the particle size distribution of the granulated clay may be such that greater than 40%, such as, for example, greater than 45%, greater than 50%, or greater than 55% of the particles have an e.s.d. of less than 0.25 μm as measured by Sedigraph.

According to some aspects of the present disclosure, the methods of making the proppants may further comprise forming pellets from the granulated clay(s). In some examples, the pellets may be formed using a "wet" method, such as, for example using a fluidizer (e.g., a spray fluidizer) or a spray dryer. In at least one example, a slurry comprising the clay may be fed into a fluidizer, such that the fluidizer forms pellets. Alternatively or additionally, the pellets may be formed using a "dry" method, such as, for example using pelleting device that does not require the feed material to be slurried. Such devices may be an Eirich mixer or a pan pelletizer. In at least one example, this may comprise adding the clay or a slurry comprising the clay into the pelleting machine to be ground, pelletized, and/or screened. In some cases, the pellet-forming steps may be performed before a sintering step.

The methods for making the proppants may further comprise sintering the granulated clay or pellets formed from the granulated clay. The sintering step may be performed at a suitable temperature. In some examples, the temperature may range from about 1000° C. to about 2000° C., e.g., from about 1200° C. to about 1800° C., from about 1400° C. to about 1600° C., from about 1300° C. to about 1500° C., from about 1350° C. to about 1450° C., from about 1400° C. to about 1500° C., from about 1400° C. to about 1450° C., from about 1500° C. to about 1700° C., or from about 1600° C. to about 1800° C. In at least one example, the sintering may be performed at a temperature ranging from about 1400° C. to about 1500° C. In at least one example, the sintering may be performed at a temperature ranging from about 1200° C. to about 1600° C. In at least one example, the sintering may be performed at a temperature ranging from about 1400° C. to about 1450° C.

The sintering process may be performed for a suitable amount of time. For example, the sintering may be performed for a time ranging from about 1 minute to about 1000 minutes, e.g., from about 1 minute to about 120 minutes, from about 30 minutes to about 120 minutes, from about 30 minutes to about 90 minutes, from about 1 minute to about 60 minutes, from about 60 minutes to about 90 minutes, from about 60 minutes to about 120 minutes, from about 120 minutes to about 200 minutes, from about 180 minutes to about 400 minutes, from about 360 minutes to about 600 minutes, from about 540 minutes to about 800 minutes, or from about 720 minutes to about 1000 minutes.

The sintering process may be performed using any suitable sintering equipment, including, for example, rotary or vertical furnaces, or tunnel or pendular sintering equipment.

The resulting proppants may have chemical and/or physical characteristics (chemical composition, crush strength, permeability, etc.) as described above and elsewhere herein.

Further provided herein are methods for treating a reservoir. The reservoir may be a well where oil or gas is pumped out of a deposit. In some examples, the reservoir may comprise a wellbore. The methods for treating a reservoir may comprise introducing the proppants described herein into the reservoir.

In some examples, the methods may further comprise mixing the proppants with a fluid and introducing the proppants-fluid mixture into the reservoir. The fluid may comprise a fracturing fluid, e.g., a fluid capable of fracturing the subterranean area around the reservoir to create paths for the oil or gas to flow toward the well bore. In some cases, at least some of the fracturing fluid may be then removed from the fractures so that the fluid does not impede the flow of the oil or gas flown into the well bore. When introduced together with the fracking fluid, the proppants may prevent the fractures from collapsing, e.g., by holding the fractures open, when at least some of the fracturing fluid is removed.

When mixed with the fluid, the proppants may have a concentration suitable for treating the reservoir. For example, the proppants may have a concentration in the fluid ranging from about 0.01 pounds of proppants added (PPA) to about 50 PPA (corresponding to about $4.54 \times 10^{-3}$ kg of proppants added to about 22.7 kg of proppants added), e.g., from about 0.05 PPA to about 40 PPA, from about 0.1 PPA to about 20 PPA, from about 0.1 PPA to about 5 PPA, from about 4 PPA to about 10 PPA, from about 9 PPA to about 15 PPA, or from about 14 PPA to about 20 PPA.

Aspects of the present disclosure are further illustrated by reference to the following exemplary numbered paragraphs.

1. A proppant comprising a ceramic, wherein the ceramic comprises from about 5% to about 25% by weight titanium dioxide; from about 30% to about 75% by weight aluminum oxide; and from about 10% to about 65% by weight silicon dioxide.

2. The proppant of paragraph 1, wherein the ceramic comprises from about 40% to about 65% by weight silicon dioxide.

3. The proppant of paragraph 1 or 2, wherein at least 80% by weight of the titanium dioxide is anatase.

4. The proppant of any one of paragraphs 1-3, wherein the ceramic further comprises from about 0.01% to about 10% by weight iron oxide.

5. A proppant comprising a ceramic, wherein the ceramic comprises from about 5% to about 40% by weight tialite and mullite.

6. The proppant of any one of paragraphs 1-5, wherein the ceramic comprises from about 10% to about 70% by weight mullite.

7. The proppant of any one of paragraphs 1-6, wherein the ceramic further comprises from about 0.05% to about 10% by weight rutile.

8. The proppant of any one of paragraphs 1-7, wherein the proppant has a crush strength of less than 10% fines at 10,000 psi.

9. The proppant of any one of paragraphs 1-8, wherein the proppant has a permeability of at least 0.01 millidarcy.

10. The proppant of any one of paragraphs 1-9, wherein the proppant further comprises a binding agent.

11. The proppant of any one of paragraphs 1-10, wherein the binding agent is a flocculation agent.

12. The proppant of paragraph 11, wherein the flocculation agent comprises an acrylate polymer.

13. The proppant of any one of paragraphs 1-12, wherein the proppant has a turbidity of less than 250 Nephelometric Turbidity Unit (NTU).

14. The proppant of paragraph 13, wherein the proppant has a turbidity of less than 50 NTU.

15. A method of making a proppant, the method comprising granulating a clay that comprises kaolinite and at least 5% by weight titanium dioxide; and sintering the granulated clay.

16. The method of paragraph 15, wherein the clay comprises at least 50% by weight kaolinite.

17. The method of paragraph 15 or 16, further comprising adding titanium dioxide to the clay before granulating.

18. The method of any one of paragraphs 15-17, wherein granulating the clay comprises grinding a slurry that comprises the clay.

19. The method of paragraph 18, wherein the slurry is prepared by combining the clay with water, the slurry having a solids content ranging from about 40% to about 60% by weight.

20. The method of paragraph 18 or 19, wherein the slurry is a first slurry prepared by combining the clay in dry form with a second slurry comprising water and a material different than the clay.

21. The method of any one of paragraphs 18-20, wherein the slurry comprises a dispersant.

22. The method of any one of paragraphs 18-21, wherein the slurry has a solids content ranging from about 45% to about 75% by weight.

23. The method of any one of paragraphs 15-22, further comprising forming a pellet from the granulated clay before sintering.

24. The method of paragraph 23, wherein the pellet is formed by a fluidizer.

25. The method of any one of paragraphs 15-24, wherein the clay is a by-product of a kaolin beneficiation process.

26. The method of paragraph 25, wherein the beneficiation process is a selective flocculation process.

27. The method of paragraph 25 or 26, wherein the by-product comprises at least 8% by weight titanium dioxide.

28. The method of any one of paragraphs 25-27, wherein the by-product comprises at least 15% by weight titanium dioxide.

29. The method of any one of paragraphs 25-28, wherein the by-product comprises a flocculating agent.

30. The method of any one of paragraphs 15-29, wherein greater than 40% of particles in the granulated clay have an equivalent spherical diameter of less than 0.25 μm as measured by Sedigraph.

31. The method of any one of paragraphs 15-30, further comprising adding a binding agent before or during granulating the clay.

32. The method of any one of paragraphs 15-31, wherein sintering is performed at a temperature ranging from about 1200° C. to about 1600° C.

33. A method of treating a reservoir, the method comprising introducing the proppant of any of paragraphs 1 to 32 into the reservoir.

34. The method of paragraph 33, wherein the reservoir comprises a wellbore.

35. The method of paragraph 33 or 34, further comprising mixing the proppant with a fluid before introducing the proppant into the reservoir.

36. The method of paragraph 35, wherein the proppant has a concentration in the fluid ranging from about 0.1 pounds of proppant added (PPA) to about 20 PPA.

37. Use of the proppant of any one or paragraphs 1 to 32 to treat a reservoir.

The following examples are intended to illustrate the present disclosure without, however, being limiting in nature. It is understood that the present disclosure encompasses additional embodiments consistent with the foregoing description and following examples.

EXAMPLES

Example 1

Samples of natural kaolin clay obtained from two different mines were used to prepare proppants A and B. The kaolin clay used to prepare proppant A was made into a slurry with 5 pounds of dispersant (sodium polyacrylate) per ton and the kaolin clay used to prepare proppant B was made down with 3 pounds of dispersant per ton.

The kaolin samples were then processed on a fluidizer as described in U.S. Pat. No. 9,771,513. Green proppants were made from the fluidization process. The green strength of the green proppants was tested using a Brookfield CT-3 analyzer (AMETEK Brookfield). The plant specification for green strength was a minimum of 20 gram force.

Next, the green proppants were fired at 1450° C. in a lab static kiln to produce 20/40 ceramic proppants (i.e., ceramic proppants with sizes ranging from 20 mesh to 40 mesh). Crush strength tests were performed following ISO 13503-2 (Proppant crush test for hydraulic fracturing and gravel-packing operations). Data for proppants A and B as compared to proppants prepared from a third control sample of clay with high (51.1%) alumina content are shown in Table 1 below.

TABLE 1

|  | A | B | Control |
| --- | --- | --- | --- |
| % 325 Mesh Residue | 9.60 | 8.70 | 6.50 |
| 0.25 micron particle size distribution | 48.20% | 43.80% | 34.7% |
| Fluidizer Feed Viscosity (centipoise) | 12.3 | 11.7 | 15.7 |
| Green Strength (gram force) | 27.08 | 28.2 | 25.99 |
| Green Bulk Density (g/cm$^3$) | 0.72 | 0.73 | 0.71 |
| Dust (%) From Fluidizer | 11.74 | 11.65 | 11.61 |
| Fired Data/Set Temp (° C.) | 1450 | 1450 | 1500 |
| % Na$_2$O (wt.) | 0.03 | 0.03 | 0.03 |
| % MgO (wt.) | 0.09 | 0.09 | 0.09 |
| % Al$_2$O$_3$ (wt.) | 42.97 | 42.95 | 51.1 |
| % SiO$_2$ (wt.) | 49.52 | 50.36 | 44.23 |
| % P$_2$O$_5$ (wt.) | 0.11 | 0.11 | 0.08 |
| % K$_2$O (wt.) | 0.04 | 0.03 | 0.08 |
| % CaO (wt.) | 0.03 | 0.04 | 0.05 |
| % TiO$_2$ (wt.) | 5.90 | 4.94 | 3.19 |
| % Fe$_2$O$_3$ (wt.) | 1.32 | 1.46 | 1.16 |
| Fired Bulk Density (g/cm$^3$) | 1.48 | 1.48 | 1.52 |
| Absolute Density (g/cm$^3$) | 2.7 | 2.68 | 2.78 |
| Mean Particle Diameter (μm) | 669 | 669 | 669 |
| 10,000 psi Crush (% Fines) | 6.5 | 6.6 | 7.3 |
| Turbidity (NTU) | 46 | 67 | 134 |

Proppant A had a green strength of 27.08 gram force and proppant B had a green strength of 28.2 gram force, both within specifications. As shown in Table 1, proppants A and B had lower turbidity values.

Example 2

Proppants were prepared from a natural kaolin clay alone and with various amounts of high purity $TiO_2$ added. The kaolin clay comprised about 3.5% $TiO_2$. A 250 gallon slurry batch of the kaolin was made down following ISO SOP-0160. For six of the seven samples, high purity (99.5%) $TiO_2$ (Fisher Scientific) was added (1.5%, 3%, 5%, 8%, 10%, and 15% of added $TiO_2$).

The mixtures were made and processed on a fluidizer to make green proppants and fired as described in Example 1. Results are shown in Table 2 below.

TABLE 3

| Chemical composition | wt. % |
| --- | --- |
| $Na_2O$ | 0.07 |
| MgO | 0.09 |
| $Al_2O_3$ | 38.97 |
| $SiO_2$ | 44.78 |
| $P_2O_5$ | 0.57 |
| $K_2O$ | 0.09 |
| CaO | 0.07 |
| $TiO_2$ | 13.86 |
| $Fe_2O_3$ | 1.50 |

TABLE 2

|  | Control | 1.50% | 3% | 5% | 8% | 10% | 15% |
| --- | --- | --- | --- | --- | --- | --- | --- |
| % 325 Mesh Residue | 1.50 | 1.50 | 1.50 | 1.50 | 1.50 | 1.50 | 1.50 |
| 0.25 micron particle size distribution | 48.10% | 49.90% | 51.90% | 54.50% | 50% | 50.90% | 57.30% |
| Fluidizer Feed Viscosity (centipoise) | 14.1 | 13.2 | 13.8 | 13.2 | 20.1 | 21.2 | 22.5 |
| Green Strength (gram force) | 24.48 | 25.73 | 25.2 | 26.8 | 24.93 | 22.53 | 23.83 |
| Green Bulk Density ($g/cm^3$) | 0.7 | 0.7 | 0.7 | 0.69 | 0.67 | 0.65 | 0.65 |
| Dust (%) From Fluidizer | 10.86 | 13.05 | 7.85 | 13.50 | 12.60 | 13.80 | 11.30 |
| Fired Data/Set Temp (° C.) | 1450 | 1450 | 1450 | 1450 | 1450 | 1450 | 1450 |
| % $Na_2O$ (wt.) | 0.03 | 0.03 | 0.04 | 0.04 | 0.04 | 0.04 | 0.04 |
| % MgO (wt.) | 0.09 | 0.09 | 0.09 | 0.09 | 0.09 | 0.09 | 0.09 |
| % $Al_2O_3$ (wt.) | 43.68 | 42.96 | 42.35 | 41.42 | 40.25 | 39.46 | 37.81 |
| % $SiO_2$ (wt.) | 51.35 | 50.57 | 49.73 | 48.81 | 47.27 | 46.49 | 44.41 |
| % $P_2O_5$ (wt.) | 0.09 | 0.08 | 0.09 | 0.09 | 0.08 | 0.08 | 0.08 |
| % $K_2O$ (wt.) | 0.07 | 0.07 | 0.07 | 0.07 | 0.06 | 0.06 | 0.06 |
| % CaO (wt.) | 0.04 | 0.04 | 0.04 | 0.04 | 0.04 | 0.04 | 0.04 |
| % $TiO_2$ (wt.) | 3.48 | 4.99 | 6.46 | 8.34 | 11.08 | 12.68 | 16.47 |
| % $Fe_2O_3$ (wt.) | 1.18 | 1.15 | 1.14 | 1.12 | 1.09 | 1.07 | 1.01 |
| Fired Bulk Density ($g/cm^3$) | 1.46 | 1.46 | 1.47 | 1.47 | 1.47 | 1.47 | 1.49 |
| Absolute Density ($g/cm^3$) | 2.67 | 2.68 | 2.69 | 2.69 | 2.7 | 2.71 | 2.75 |
| Mean Particle Diameter (μm) | 669 | 669 | 669 | 669 | 669 | 669 | 669 |
| 10,000 psi Crush (% Fines) | 8.5 | 8 | 7.5 | 7 | 6.7 | 6.3 | 5.8 |
| Turbidity (NTU) | 75 | 39 | 61 | 71 | 52 | 55 | 73 |

The data suggests a direct correlation between the amount of titanium dioxide and the quality of the proppants. For example, the 10,000 psi crush value decreased as the titanium dioxide increased. Both the bulk density and the absolute specific gravity increased as the titanium dioxide amount increased. When adding in titanium dioxide, the 10,000 psi crush strength improved (i.e., the 10,000 psi crush value decreased) even when the alumina content decreased. Adding an extra 15% titanium dioxide level resulted in proppants with quality better than proppants with lower titanium dioxide contents.

Example 3

Two different proppants (D and E) were prepared from mixtures of a natural kaolin clay and a clay by-product from a kaolin beneficiation process. The by-product (15,000 gallons) was obtained from kaolin flocculation according to the process described in U.S. Pat. No. 6,068,693, which is incorporated by reference herein. The chemical composition of the by-product is shown in Table 3 below, showing a relatively high amount of $TiO_2$.

The by-product clay, which had approximately 1% (ranging from 0.3% to 1.5%) solids content, was dewatered in a centrifuge to produce a material with about 50% solids content. Proppant D was prepared from a mixture of 10% by-product clay and 90% natural kaolin clay; and proppant E was prepared from a mixture of ⅓ by-product clay, ⅓ natural kaolin clay, and ⅓ bauxitic kaolin. The two proppants were prepared as described in Example 1, with results shown in Table 4.

TABLE 4

|  | D | E |
| --- | --- | --- |
| % 325 Mesh Residue | 1.20 | 6.10 |
| 0.25 micron particle size distribution | 50.40% | 48.20% |
| Fluidizer Feed Viscosity (centipoise) | 12.9 | 17.1 |
| Green Strength (gram force) | 35.6 | 48.2 |
| Green Bulk Density ($g/cm^3$) | 0.73 | 0.79 |
| Dust (%) From Fluidizer | 6.90 | 7.30 |
| Fired Data/Set Temp (° C.) | 1450 | 1450 |
| % $Na_2O$ (wt.) | 0.04 | 0.04 |

TABLE 4-continued

|  | D | E |
|---|---|---|
| % MgO (wt.) | 0.08 | 0.09 |
| % $Al_2O_3$ (wt.) | 42.88 | 45.61 |
| % $SiO_2$ (wt.) | 50.32 | 44.79 |
| % $P_2O_5$ (wt.) | 0.15 | 0.27 |
| % $K_2O$ (wt.) | 0.06 | 0.07 |
| % CaO (wt.) | 0.04 | 0.05 |
| % $TiO_2$ (wt.) | 5.23 | 7.85 |
| % $Fe_2O_3$ (wt.) | 1.2 | 1.26 |
| Fired Bulk Density (g/cm$^3$) | 1.46 | 1.47 |
| Absolute Density (g/cm$^3$) | 2.68 | 2.7 |
| Mean Particle Diameter (μm) | 669 | 669 |
| 10,000 psi Crush (% Fines) | 7.3 | 6.6 |
| Turbidity (NTU) | 45 | 116 |

Example 4

FIG. 1 shows exemplary X-Ray diffraction (XRD) patterns for various proppants made in Example 2 above, wherein F=natural kaolin clay, G=natural kaolin clay+5% $TiO_2$; H=natural kaolin clay+10% $TiO_2$; and I=natural kaolin clay+15% $TiO_2$. The X-ray settings were 45 kV and 40 milliamnps. The XRD patterns were measured following ISO 13503-5. The XRD patterns showed the presence of mullite, tialite, and rutile (cristobalite also observed at ~21.8 2θ, not shown in FIG. 1), wherein less amounts of mullite and greater amounts of tialite were observed for increasing amounts of $TiO_2$ added.

Other aspects and embodiments of the present disclosure will be apparent to those skilled in the art from consideration of the specification and practice of the embodiments disclosed herein.

It is intended that the specification and examples therein be considered as exemplary only, with a true scope and spirit of the present disclosure being indicated by the following claims.

What is claimed is:

1. A proppant comprising a ceramic, wherein the ceramic comprises:
   from about 5% to about 25% by weight titanium dioxide;
   from about 30% to about 75% by weight aluminum oxide; and
   from about 40% to about 65% by weight silicon dioxide,
   wherein the proppant has a turbidity of less than 250 Nephelometric Turbidity Unit (NTU) measured according to ISO 13503-2.

2. The proppant of claim 1, wherein at least 80% by weight of the titanium dioxide is anatase.

3. The proppant of claim 1, wherein the ceramic further comprises from about 0.01% to about 10% by weight iron oxide.

4. A proppant comprising a ceramic, wherein the ceramic comprises:
   from about 5% to about 40% by weight tialite; and
   mullite.

5. The proppant of claim 4, wherein the ceramic comprises from about 10% to about 70% by weight mullite.

6. The proppant of claim 4, wherein the ceramic further comprises from about 0.05% to about 10% by weight rutile.

7. The proppant of claim 1, wherein the proppant has a crush strength of less than 10% fines at 10,000 psi.

8. The proppant of claim 1, wherein the proppant has a permeability of at least 0.01 millidarcy.

9. The proppant of claim 1, wherein the proppant further comprises a binding agent.

10. The proppant of claim 9, wherein the binding agent is a flocculation agent.

11. The proppant of claim 10, wherein the flocculation agent comprises an acrylate polymer.

12. The proppant of claim 1, wherein the proppant has a turbidity of less than 50 NTU measured according to ISO 13503-2.

13. A method of treating a reservoir, the method comprising:
   introducing the proppant of claim 1 into the reservoir.

14. The method of claim 13, wherein the reservoir comprises a wellbore.

15. The method of claim 13, further comprising mixing the proppant with a fluid before introducing the proppant into the reservoir.

16. The method of claim 15, wherein the proppant has a concentration in the fluid ranging from about 0.1 pounds of proppant added (PPA) to about 20 PPA.

17. The proppant of claim 4, wherein the proppant has a crush strength of less than 10% fines at 10,000 psi, a permeability of at least 0.01 millidarcy, and a turbidity of less than 250 Nephelometric Turbidity Unit (NTU).

18. The proppant of claim 17, wherein the proppant further comprises an acrylate polymer.

\* \* \* \* \*